(No Model.)
H. M. BROOKS.
TROLLEY ROPE PROTECTOR.
No. 578,542. Patented Mar. 9, 1897.
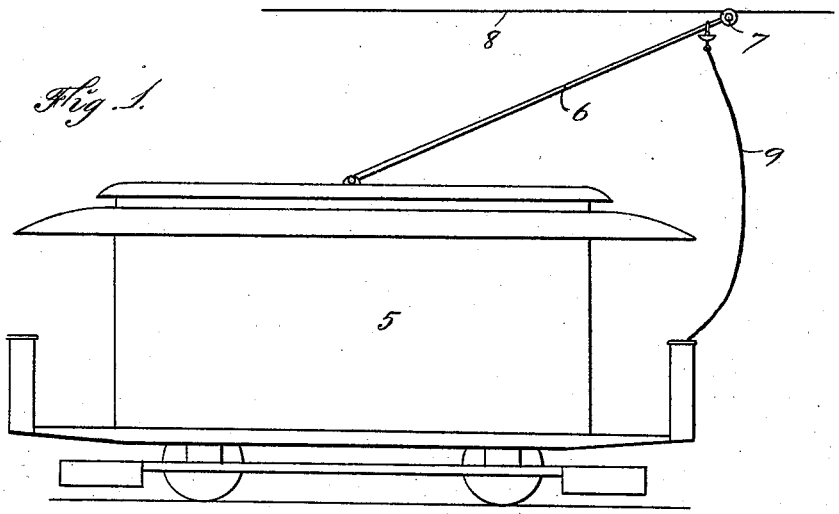
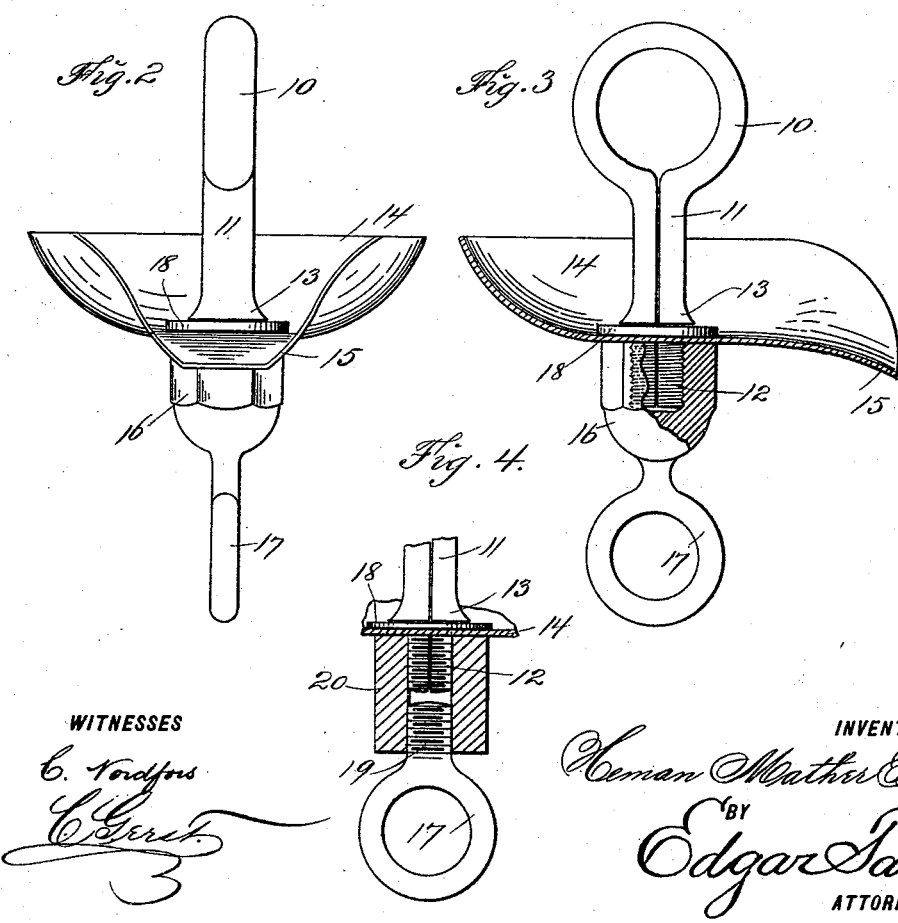
WITNESSES
INVENTOR
Heman Mather Brooks.
BY Edgar Tate & Co
ATTORNEYS.

UNITED STATES PATENT OFFICE.

HEMAN MATHER BROOKS, OF NEW HAVEN, CONNECTICUT.

TROLLEY-ROPE PROTECTOR.

SPECIFICATION forming part of Letters Patent No. 578,542, dated March 9, 1897.

Application filed August 26, 1896. Serial No. 603,961. (No model.)

*To all whom it may concern:*

Be it known that I, HEMAN MATHER BROOKS, a citizen of the United States, and a resident of New Haven, in the county of New Haven and State of Connecticut, have invented certain new and useful Improvements in Trolley-Rope Protectors, of which the following is a specification, reference being had to the accompanying drawings, forming a part thereof, in which similar numerals of reference indicate corresponding parts wherever found throughout the several views.

This invention relates to trolley-cars, and to that class thereof provided with a trolley-pole which is connected with the top of the car and which supports a trolley which is adapted to bear upon a trolley wire or conductor; and the object of the invention is to provide a shield or guard for the cord or rope which is connected with the trolley-pole, whereby the dirty and greasy water from the trolley wires and wheels is prevented from running down the rope or cord, and thus interfering with the management thereof.

The invention is fully disclosed in the following specification, of which the accompanying drawings form a part, in which—

Figure 1 is a side view of a trolley-car, showing my improvement connected therewith; Fig. 2, an end view of the means by which the cord or rope is connected with the trolley-pole and showing my improvement connected therewith; Fig. 3, a sectional side view thereof, and Fig. 4 a sectional view of a modified form of construction.

In the drawings forming part of this specification I have shown at 5 an ordinary trolley-car which is provided with the usual trolley pole or arm 6, which carries a trolley 7, which is adapted to bear upon the trolley wire or conductor 8, and connected with said pole or arm near the trolley 7 is the usual cord or rope 9, which is under the control of the conductor, and in the practice of my invention I connect the cord or rope 9 with the trolley-pole 6 by means of a ring 10, provided with a shank 11, the end of which is screw-threaded, as shown at 12, and mounted on the screw-threaded portion 12 below an annular shoulder 13, formed on the shank 11, is my improved guard or shield 14, which is preferably circular and cup-shaped in form and provided at one side with a downwardly-directed spout 15.

The shield or guard is held on the shank 11 by means of an attachment consisting of a cylindrical or other shaped head 16, which is provided with a ring 17, to which the rope or cord 9 is secured, and mounted between the bottom of the shield or guard 14 and the annular shoulder 13 on the shank 11 is a washer 18, of leather or other suitable material.

In the construction shown and described the ring 10 is composed of wire bent into the proper form, and the shank 11 thereof is composed of two separate parts, consisting of the ends of said wire, which are brought together and screw-threaded, and in the construction shown in Fig. 4 the ring 17 is formed separately from the head 16, and is provided with a screw-threaded shank 19, which is connected with the screw-threaded portion 12 of the shank 11 by a tubular head 20.

The tubular head 20 may be composed of insulating material, and the attachment shown in Fig. 3, consisting of the head 16 and ring 17, may also be composed of insulating material, and the object of the shield or guard 14 is to prevent water from running down over the cord or rope 9.

When constructed in the usual manner, dirty and greasy water from the trolley-wire and trolley frequently collects and runs down the cord or rope 9, thus interfering with the manipulation or operation of said cord or rope; and the object of this invention is to prevent this operation, and with my improved guard or shield constructed and attached as herein shown and described the water referred to collects therein and is discharged through the spout 15, and does not run down the cord or rope 9, as above described.

My improvement is well adapted to accomplish the result for which it is intended, and is also comparatively inexpensive, and it is evident that the various parts thereof may be composed of any preferred material.

Having fully described my invention, I claim as new and desire to secure by Letters Patent—

1. The combination with the rope or cord of a trolley arm or pole, of a shield or guard connected therewith, adjacent to said trolley arm or pole, said shield or guard being cup-shaped in form, and provided with a discharge-spout at one side thereof, substantially as shown and described.

2. The combination with a trolley arm or pole, of a cord or rope connected therewith, and under the control of the motorman, said cord or rope being connected with said trolley arm or pole, by means of a ring provided with a shank to which is secured a ring to which said rope or cord is attached, and a cup-shaped shield or guard connected with one of said parts, said shield or guard being provided with a discharge-spout at one side thereof, substantially as shown and described.

3. The herein-described means for connecting a cord or rope with a trolley arm, or pole, consisting of a ring which is adapted to be connected with the pole, and provided with a shank the end of which is screw-threaded, a cup-shaped guard or shield mounted thereon, and another ring connected with said screw-threaded shank to which the cord or rope is secured, said shield or guard being provided with a discharge-spout at one side thereof, substantially as shown and described.

4. The herein-described device for connecting a cord or rope with the trolley arm or pole of a trolley-car, said device being provided with a shield or guard to prevent water from running down the cord or rope, substantially as shown and described.

In testimony that I claim the foregoing as my invention I have signed my name, in presence of the subscribing witnesses, this 20th day of August, 1896.

HEMAN MATHER BROOKS.

Witnesses:
LEVI HAYNE,
GEO. L. ARMSTRONG.